(12) United States Patent
Tanaka et al.

(10) Patent No.: US 11,999,113 B2
(45) Date of Patent: Jun. 4, 2024

(54) COMPOSITE PARTS AND PROCESSES OF MANUFACTURE

(71) Applicant: VICTREX MANUFACTURING LIMITED, Thornton Cleveleys (GB)

(72) Inventors: Masakazu Tanaka, Thornton-Cleveleys (GB); Stuart Green, Thornton-Cleveleys (GB); Peter Niedermann, Thornton-Cleveleys (GB)

(73) Assignee: Victrex Manufacturing Limited, Thornton-Cleveleys (GB)

( * ) Notice: Subject to any disclaimer, the term of this patent is extended or adjusted under 35 U.S.C. 154(b) by 659 days.

(21) Appl. No.: 17/059,631

(22) PCT Filed: May 30, 2019

(86) PCT No.: PCT/GB2019/051478
§ 371 (c)(1),
(2) Date: Nov. 30, 2020

(87) PCT Pub. No.: WO2019/229442
PCT Pub. Date: Dec. 5, 2019

(65) Prior Publication Data
US 2021/0276276 A1  Sep. 9, 2021

(30) Foreign Application Priority Data

May 31, 2018 (GB) .................................. 1808886
Mar. 6, 2019 (GB) .................................. 1902994

(51) Int. Cl.
*B29C 70/44* (2006.01)
*B29C 70/00* (2006.01)
(Continued)

(52) U.S. Cl.
CPC ............ *B29C 70/003* (2021.05); *B29C 70/44* (2013.01); *B32B 5/12* (2013.01); *B32B 27/285* (2013.01);
(Continued)

(58) Field of Classification Search
CPC ................ B32B 5/12; B32B 2260/023; B32B 2260/046; C08G 65/4012; C08G 2650/40
See application file for complete search history.

(56) References Cited

U.S. PATENT DOCUMENTS 4,770,838 A  9/1988 Cattanach et al.
4,904,532 A  2/1990 Staniland et al.
(Continued)

FOREIGN PATENT DOCUMENTS

EP    0102158    3/1984
EP    0102159    3/1984
(Continued)

OTHER PUBLICATIONS

International Search Report and Written Opinion of PCT/GB2019/051478, dated May 12, 2019 (9 pages).
(Continued)

*Primary Examiner* — Vishal I Patel
(74) *Attorney, Agent, or Firm* — Casimir Jones, S.C.; Anne M. Reynolds

(57) ABSTRACT

The disclosure relates to polymer-containing composite materials and to unusually low-pressure consolidation methods for forming composite parts from such materials. More specifically, for example, the disclosure relates to use of a certain "PEEK-PEDEK" copolymer in low-pressure consolidation methods, using as little as 1 bar pressure (or using atmospheric pressure acting on a consolidation that is held under vacuum) to provide composite parts that are substantially void-free.

14 Claims, 10 Drawing Sheets

(51) Int. Cl.
  *B32B 5/12* (2006.01)
  *B32B 27/28* (2006.01)
  *B32B 37/00* (2006.01)
  *B32B 37/06* (2006.01)
  *B32B 37/15* (2006.01)
  *C08G 65/40* (2006.01)
  *B29K 71/00* (2006.01)
  *B29K 105/08* (2006.01)

(52) U.S. Cl.
  CPC ........ *B32B 37/003* (2013.01); *B32B 37/0084* (2013.01); *B32B 37/06* (2013.01); *B32B 37/15* (2013.01); *C08G 65/4012* (2013.01); *B29K 2071/00* (2013.01); *B29K 2105/0881* (2013.01); *B32B 2260/023* (2013.01); *B32B 2260/046* (2013.01); *B32B 2262/101* (2013.01); *B32B 2262/106* (2013.01); *B32B 2305/076* (2013.01); *B32B 2371/00* (2013.01); *C08G 2650/40* (2013.01)

(56) References Cited

U.S. PATENT DOCUMENTS

| | | | | |
|---|---|---|---|---|
| 5,843,355 | A * | 12/1998 | McCarville | B29C 70/345 156/212 |
| 6,372,294 | B1 | 4/2002 | Vodermayer et al. | |
| 2011/0064908 | A1 * | 3/2011 | Kweder | B29C 70/345 428/113 |
| 2014/0134378 | A1 * | 5/2014 | Downs | B29C 33/76 156/196 |
| 2015/0099105 | A1 * | 4/2015 | Kurtz | B29C 43/3642 156/243 |
| 2016/0152769 | A1 * | 6/2016 | Wilson | C08G 65/40 528/125 |

FOREIGN PATENT DOCUMENTS

| | | | |
|---|---|---|---|
| EP | 0225750 | 6/1987 | |
| EP | 1215022 | 6/2002 | |
| GB | 2526243 | 11/2015 | |
| GB | 2542704 | 3/2017 | |
| WO | WO 88/03468 A2 | 5/1988 | |
| WO | WO 2003/093354 | 11/2003 | |
| WO | WO 2014/207458 | 12/2014 | |
| WO | WO-2014207458 A1 * | 12/2014 | ............ C08G 65/40 |
| WO | WO 2015/189567 | 12/2015 | |

OTHER PUBLICATIONS

Miller & Gibson, "Impregnation Techniques for Thermoplastic Matrix Composites," 1996 *Polymer & Polymer Composites* 4(7), 459-481.

Search Report of GB1808886.4, dated Dec. 14, 2018 (4 pages).

Third Party Observation submitted in PCT/GB2019/051478, dated Sep. 23, 2020 (2 pages).

Cogswell, F.N., "Chapter 3—Product Forms," *Thermoplastic aromatic polymer composites: a study of the structure, processing and properties of carbon fibre-reinforced polyetheretherketone and related materials*, (1993) Butterworth-Heinemann, Oxford, 1992 ISBN 0 7506 1086 7, pp. 51-77.

* cited by examiner

COMPOSITE PARTS AND PROCESSES OF MANUFACTURE

FIELD OF THE INVENTION

The invention relates to polymer-containing composite materials and to unusually low-pressure consolidation methods for forming composite parts from such materials. More specifically, for example, the invention relates to use of a certain "PEEK-PEDEK" copolymer in low-pressure consolidation methods, using as little as 1 bar pressure (or using atmospheric pressure acting on a consolidation that is held under vacuum) to provide composite parts that are substantially void-free.

BACKGROUND

The world of aerospace composite materials may be considered to exist in two camps: those based on thermosets and those based on thermoplastics. Thermosets had a head start in the 1960's, but both polymer chemistries have been available commercially in the industry since the early 1980's when the thermoplastic polymer known as polyetheretherketone (PEEK) was developed by Imperial Chemical Industries (ICI). Both polymer systems generally have comparable mechanical properties (with thermoplastics generally being tougher) and both present manufacturing and processing advantages/disadvantages relative to each other. During the 1990's, thermosets won out during the development of significant aerospace civil aircraft development projects, largely based on cost and the ease of parts manufacture, as thermosets have tacky surfaces that enable them to be stacked without ply slippage. Thermosets were seen as softer and more conformable to aid layup, and their lower cost was attractive to aircraft build economics at that time.

Now, in 'the new era', things are changing and the emphasis is on build rate for mid-market single aisle aircraft, with manufacturers looking to significantly increase monthly output. Some aircraft manufacturers estimate a build rate of fifty-seven aircraft per month in 2019 for their new aircraft and others are looking to produce sixty new aircraft per month in the same timeframe. In part this is being facilitated with the development of automated tape laying (ATL) and automated fibre placement (AFP) suited to some thermoplastic pre-impregnated materials (i.e. "prepregs"). Interest in these materials is being boosted further with developments in "out-of-autoclave" processing, hot stamping and hybrid overmoulding. Such processes help manufacturers make parts more quickly and economically, avoiding the need for high numbers of expensive autoclaves and factories to house them. The prospects for thermoplastic composites in this sector are now improved.

To help realise the aims of the aircraft manufacturers, there is a need to try to develop new prepregs that may facilitate speed of manufacture. Additionally, the use of thermoplastic prepregs for parts that have historically been made of metal may lead to weight savings on aircraft which may in turn lead to environmental benefits. There is a growing need for improved composite materials and processes for making composite materials and parts suitable for use in different consolidation methods, while providing good mechanical properties, in order to provide improved performance of consolidated parts.

BRIEF SUMMARY

In a first aspect of the invention, there is provided a process for forming a composite part, the process comprising:

selecting a composite material comprising a polymeric material having a repeat unit of formula (I):

   (I)

and a repeat unit of formula (II):

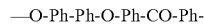   (II)

wherein Ph represents a phenylene moiety and wherein the shear viscosity, SV, of the polymeric material, measured by a Standard method as defined in ISO11443:2014, is in the range from around 100 Pa·s to around 200 Pa·s, at 400° C., at a shear rate of 1000 $s^{-1}$;

and unidirectional fibres;

wherein the unidirectional fibres are submerged in a dispersion of particles of the polymeric material to form a pre-impregnated tape;

arranging the pre-impregnated tape into a laminate comprising a plurality of layers of pre-impregnated tape to form a kitted stack;

heating the kitted stack at a consolidation temperature of at least 305° C. for at least 15 minutes at a consolidation pressure of less than 10 bar.

Optionally, the consolidation temperature is at least 340° C.

Optionally, the consolidation pressure is between atmospheric pressure and 8 bar, and more preferably, the consolidation pressure is less than 5 bar or less than 3 bar, or around 1 bar.

Optionally, the kitted stack is under vacuum within a flexible membrane allowing atmospheric pressure to consolidate the stack.

Optionally, the process may further comprise arranging the pre-impregnated tape using hand lay-up. Spot welding may be used to temporarily secure the individual tapes in place during the arranging step.

Optionally, the process may further comprise arranging the pre-impregnated tape using automated fibre placement.

Optionally, the plurality of layers of pre-impregnated tape may be arranged such that the direction of the pre-impregnated tape in the subsequent layer is positioned at 45 degrees to the direction of the pre-impregnated tape of the preceding layer. The tape may be laid in a number of different arrangements including +45/−45 such that the principle direction of the tape is offset between subsequent layers by 90°. Alternatively, subsequent layers may be laid in the following arrangement +45°/0°/−45°/90°, or alternatively, combinations of 0°, 90°, +45° and −45° that are symmetrical and balanced about a mid-plane, alternatively lay-ups may include other lay-ups based on other ply angles such as 60°, 120° and 240°.

Optionally, the kitted stack is spot-welded after each layer is laid to secure each subsequent layer to the previous layer in the stack.

Optionally, the heating step is carried out using a hot iron to tack the layers together.

It has been surprisingly found that composite parts formed using the process as recited above provide excellent mechanical properties even when processed using low pressure (e.g. 1 bar applied pressure) consolidation methods compared with conventional thermoplastic composites which generally require higher pressures to consolidate them (>10 bar applied pressure). The method of the invention has even been found to work where the consolidation is carried out in an applied vacuum e.g. consolidating inside a bag under vacuum where the applied pressure of up to 1 bar arises from normal atmospheric pressure pressing onto the vacuum bag. One advantage of the invention is that composite materials described herein have surprisingly far lower levels of unwanted voids compared with composite materials made using other polyaryletherketone polymers (PAEKs). Voids in composite parts are known to cause mechanical failure and developing technological improvements that reduce voids in composite materials is therefore an advantage.

Following the process described above, the composite materials according to the present invention exhibits very low void content under such processing conditions, being significantly below 1% by volume of the consolidated composite, often being below the limits of detection using standard methods such as ASTM D 3171 method 1B-15 or DIN EN ISO 1183-1 A, 2013-04.

In a second aspect, there is disclosed a composite part, the composite part comprising a polymeric material having a repeat unit of formula (I):

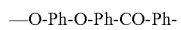   (I)

and a repeat unit of formula

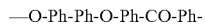   (II)

wherein Ph represents a phenylene moiety and wherein the shear viscosity, SV, of the polymeric material, measured by a Standard method as defined in ISO11443:2014, is in the range from around 100 Pa·s to around 200 Pa·s, at 400° C., at a shear rate of 1000 s$^{-1}$; and
unidirectional fibres.

It has been surprisingly found that composite parts of the present invention may be processed either by laying the composite material by hand or by automated fibre placement (AFP) and can be processed via press or oven consolidation to form fully consolidated laminates that are essentially void free. In-situ consolidation is also possible and results in certain benefits over prior art processes.

Furthermore, it has been found that kitted pre-impregnated stacks can be compression moulded either in a low pressure press, or in an oven under vacuum to create compacted laminates that have substantially equivalent physical and mechanical properties to conventional laminates that have been processed at far higher pressures.

In a further aspect of the invention, there is provided the use of a composite material according to the second aspect of the invention, in the process of or in the process of oven consolidation. The second aspect of the invention may also be formed in an in-situ consolidation process.

It has been surprisingly found that using composite materials as described in the first aspect to form composite parts using low pressure press consolidation or oven consolidation leads to composite parts having excellent mechanical properties because the composite parts do not include voids within the structure of the composite. These consistent density parts provide excellent mechanical properties without weakness and failure points often found in prior art examples of composite parts where voids within the parts cause mechanical weaknesses.

The Following Features and Discussion is Applicable to the Polymeric Material:

In this specification and elsewhere the terms "PEEK" and "PEEK-PEDEK" are used to refer to a polymer and copolymer respectively. As mentioned above, PEEK is a convenient shorthand for polyetheretherketone, which in turn is a convenient shorthand to describing the functional groups (i.e. ether, ether, ketone) that sit in between unmentioned phenylene groups in the monomer units making up the polymer chain. In a similar way "PEEK-PEDEK" indicates that there are two different types of monomer unit contained within the polymer, i.e. it is a copolymer. "PEDEK" stands for the shorthand term "polyetherdiphenyletherketone" where again a phenylene unit is not mentioned but assumed to exist between the ether and ketone functional groups that are mentioned towards the end of "polyetherdiphenyletherketone" shorthand.

Preferably the repeat units (I) and (II) are in the relative molar proportions (I):(II) of from 65:35 to 95:5, for example, 75:25.

Preferably, in the polymeric material, the following relationship applies: $\log_{10}$ (X %)>1.50-0.26 MV; wherein:

X % refers to the % crystallinity measured as described in Example 31 of WO2014207458 A1 (incorporated herein) and;

MV refers to the melt viscosity measured using capillary rheometry operating at 340° C. at a shear rate of 1000 s$^{-1}$ using a circular cross-section tungsten carbide die, 0.5 mm (capillary diameter)×3.175 mm (capillary length) also as described in WO2014207458A1. The MV measurement is taken 5 minutes after the polymer has fully melted, which is taken to be 5 minutes after the polymer is loaded into the barrel of the rheometer.

The phenylene moieties (Ph) in each repeat unit may independently have 1,4-(i.e. para) linkages to atoms to which they are bonded or 1,3-(i.e. meta) linkages. Where a phenylene moiety includes 1,3-linkages, the moiety will be in the amorphous phase of the polymer. Crystalline phases will include phenylene moieties with 1,4-linkages. In many applications it is preferred for the polymeric material to be highly crystalline and, accordingly, the polymeric material preferably includes high levels of phenylene moieties with 1,4-linkages.

In a preferred embodiment, at least 95%, preferably at least 99%, of the number of phenylene moieties (Ph) in the repeat unit of formula (I) have 1,4-linkages to moieties to which they are bonded. It is especially preferred that each phenylene moiety in the repeat unit of formula (I) has 1,4-linkages to moieties to which it is bonded.

In a preferred embodiment, at least 95%, preferably at least 99%, of the number of phenylene moieties (Ph) in the repeat unit of formula (II) have 1,4-linkages to moieties to which they are bonded. It is especially preferred that each phenylene moiety in the repeat unit of formula (II) has 1,4-linkages to moieties to which it is bonded.

Preferably, the phenylene moieties in the repeat unit of formula (I) are unsubstituted.

Preferably, the phenylene moieties in repeat unit of formula (II) are unsubstituted.

Said repeat unit of formula (I) suitably has the structure (VI):

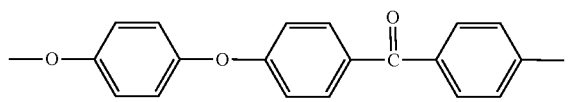   (VI)

Said repeat unit of formula (II) suitably has the structure (VII):

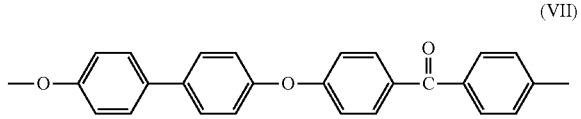

(VII)

Preferred polymeric material in accordance with the invention has a crystallinity which is greater than expected from the prior art. Preferably, $\log_{10}$ (X %)>1.50−0.23 MV. More preferably $\log_{10}$ (X %)>1.50−0.28 MV+0.06 MV².

Said polymeric material may include at least 68 mol %, preferably at least 71 mol % of repeat units of formula (I). Particular advantageous polymeric material may include at least 72 mol %, or, especially, at least 74 mol % of repeat units of formula (I). Said polymeric material may include less than 90 mole %, suitably 82 mol % or less of repeat units of formula (I). Said polymeric material may include 68 to 82 mol %, preferably 70 to 80 mol %, more preferably 72 to 77 mol % of units of formula (I).

Said polymeric material may include at least 10 mol %, preferably at least 18 mol %, of repeat units of formula (II). Said polymeric material may include less than 32 mol %, preferably less than 29 mol % of repeat units of formula (II). Particularly advantageous polymeric materials may include 28 mol % or less; or 26 mol % or less of repeat units of formula (II). Said polymeric material may include 18 to 32 mol %, preferably 20 to 30 mol %, more preferably 23 to 28 mol % of units of formula (II).

The sum of the mol % of units of formula (I) and (II) in said polymeric material is suitably at least 95 mol %, is preferably at least 98 mol %, is more preferably at least 99 mol % and, especially, is about 100 mol %.

The ratio defined as the mol % of units of formula (I) divided by the mol % of units of formula (II) may be in the range 1.8 to 5.6, is suitably in the range 2.3 to 4 and is preferably in the range 2.6 to 3.3.

The melt temperature, $T_m$ of said polymeric material (suitably measured as described herein) may be less than 330° C., is suitably less than 320° C., is preferably less than 310° C. In some embodiments, the Tm may be less than 306° C. The $T_m$ may be greater than 280° C., or greater than 290° C., 295° C. or 300° C. The $T_m$ is preferably in the range 300° C. to 310° C.

The glass transition temperature, $T_g$ of said polymeric material (suitably measured as described herein) may be greater than 130° C., preferably greater than 135° C., more preferably 140° C. or greater. The $T_g$ may be less than 175° C., less than 165° C., less than 160° C. or less than 155° C. The $T_g$ is preferably in the range 145° C. to 155° C.

The difference $(T_m-T_g)$ between the $T_m$ and $T_g$ may be at least 130° C., preferably at least 140° C., more preferably at least 150° C. The difference may be less than 170° C. or less than 165° C. In a preferred embodiment, the difference is in the range 145-165° C.

In a preferred embodiment, said polymeric material has a $T_g$ in the range 145° C.-155° C., a $T_m$ in the range 300° C. to 310° C. and the difference between the $T_m$ and $T_g$ is in the range 145° C. to 165° C.

Said polymeric material may have a crystallinity of around 10 to 20%, and more preferably up to around 30% measured as described in Example 31 of WO2014207458 A1 incorporated herein.

Said polymeric material suitably has a melt viscosity (MV) of at least 0.10 kNsm⁻², preferably has a MV of at least 0.15 kNsm⁻², more preferably at least 0.20 kNsm⁻², especially at least 0.25 kNsm⁻². MV is suitably measured using capillary rheometry operating at 340° C. at a shear rate of 1000 s⁻¹ using a tungsten carbide die, 0.5 mm×3.175 mm. Said polymeric material may have a MV of less than 1.8 kNsm⁻², suitably less than 1.2 kNsm⁻².

Said polymeric material may have a tensile strength, measured in accordance with ISO527 of at least 40 MPa, preferably at least 60 MPa, more preferably at least 80 MPa. The tensile strength is preferably in the range 80-110 MPa, more preferably in the range 80-100 MPa.

Said polymeric material may have a flexural strength, measured in accordance with ISO178 of at least 130 MPa. The flexural strength is preferably in the range 135-180 MPa, more preferably in the range 140-150 MPa.

Said polymeric material may have a flexural modulus, measured in accordance with ISO178 of at least 2 GPa, preferably at least 3 GPa. The flexural modulus is preferably in the range 3.0-4.5 GPa, more preferably in the range 3.0-4.0 GPa.

Said polymeric material may be in the form of pellets or granules, wherein the pellets or granules include at least 95 wt %, preferably at least 99 wt %, especially about 100 wt % of said polymeric material. Pellets or granules may have a maximum dimension of less than 10 mm, preferably less than 7.5 mm, more preferably less than 5.0 mm.

In the context of the present invention, the Glass Transition Temperature ($T_g$), the Cold Crystallisation Temperature ($T_n$), the Melting Temperature ($T_m$) and Heat of Fusions of Nucleation ($\Delta Hn$) and Melting ($\Delta Hm$) may be determined using the following DSC method:

A dried sample of a polymer is compression moulded into an amorphous film, by heating 7 g of polymer in a mould at 400° C. under a pressure of 50 bar for 2 minutes, then quenching in cold water producing a film of dimensions 120×120 mm, with a thickness in the region of 0.20 mm. A 8 mg plus or minus 3 mg sample of each film is scanned by DSC as follows:

Step 1 Perform and record a preliminary thermal cycle by heating the sample from 30° C. to 400° C. at 20° C. per minute.

Step 2 Hold for 5 minutes.

Step 3 Cool at 20° C./min to 30° C. and hold for 5 minutes.

Step 4 Re-heat from 30° C. to 400° C. at 20° C. per minute, recording the $T_g$, $T_n$, $t_m$, $\Delta Hn$ and $\Delta Hm$.

From the DSC trace resulting from the scan in step 4, the onset of the $T_g$ is obtained as the intersection of the lines drawn along the pre-transition baseline and a line drawn along the greatest slope obtained during the transition. The $T_n$ is the temperature at which the main peak of the cold crystallisation exotherm reaches a maximum. The $T_m$ is the temperature at which the main peak of the melting endotherm reaches a maximum.

The Heats of Fusion for Nucleation ($\Delta Hn$) and Melting ($\Delta Hm$) are obtained by connecting the two points at which the cold crystallisation and melting endotherm(s) deviate from the relatively straight baseline. The integrated areas under the endotherms as a function of time yield the enthalpy (mJ) of the particular transition, the mass normalised Heats of Fusion are calculated by dividing the enthalpy by the mass of the specimen (J/g).

The polymeric material having a repeat unit of formula (I):

—O-Ph-O-Ph-CO-Ph-      (I)

and a repeat unit of formula (II):

—O-Ph-Ph-O-Ph-CO-Ph-      (II)

wherein Ph represents a phenylene moiety, may be produced using the following process (and described in WO2014207458 A1—incorporated herein), said process comprises polycondensing a mixture of at least one dihydroxybenzene compound and at least one dihydroxybiphenyl compound in the molar proportions 65:35 to 95:5 with at least one dihalobenzophenone compound in the presence of sodium carbonate and potassium carbonate wherein:
(i) the mole % of said potassium carbonate is at least 2.5 and less than 5, and/or
(ii) the following relationship (referred to as the "$D_{50}$/mole % relationship") applies $$\frac{\text{the } D_{50} \text{ of said sodium carbonate in } \mu m}{\text{mole \% of potassium carbonate}} = < 46.$$

The mole % of said potassium carbonate is suitably defined as:

$$\frac{\text{the number of moles potassium carbonate}}{\text{the total number of moles of hydroxy monomer(s) used}} \times 100\%$$

The $D_{50}$ of the sodium carbonate may be measured as described in Example 29 of WO2014207458 A1 (incorporated herein).

The mole % of said potassium carbonate is suitably defined as:

$$\frac{\text{the number of moles potassium carbonate}}{\text{the total number of moles of hydroxy monomer(s) used}} \times 100\%$$

Under option (i), the mole % of said potassium carbonate may be at least 3 mole %, is preferably at least 3.5 mole %, is more preferably at least 3.9 mole %. The mole % of said potassium carbonate may be of said potassium carbonate is in the range 3.5 to 4.9 mole %.

The total mole % of carbonates used in the method (i.e. the total number of moles of carbonates used in method divided by the total number of moles of hydroxy monomer(s) used, expressed as a percentage) is suitably at least 100%.

The total mole % of carbonates may be greater than 100 mole %. It may be less than 105 mole %.

The mole % of sodium carbonate used in the method may be at least 90 mole %, preferably at least 92 mole %, more preferably at least 95 mole %.

The sum of the mole % (again related to the moles of hydroxy monomer(s)) of sodium carbonate and potassium carbonate used in the method is preferably at least 100 mole % and is more preferably greater than 100 mole %. It may be in the range 100-105 mole %.

The mole % of carbonates (which term is intended to encompass carbonate ($CO_3^{2-}$) and bicarbonate ($HCO_3^-$)) other than sodium carbonate and potassium carbonate used in the method is preferably less than 5 mole %, more preferably less than 1 mole % (again related to the moles of hydroxy monomer(s)).

Preferably, the only carbonates used in the method are sodium carbonate and potassium carbonate.

Under option (ii), the D50/mole % relationship is preferably less than 44, more preferably less than 42, especially less than 40. Said relationship may be less than 30 or 26.

D50 is suitably measured as described in Example 29 of WO2014207458 A1 (incorporated herein).

Preferably, both the relationships described in options (i) and (ii) apply.

The potassium carbonate selected for use in the method is preferably able to pass through a 500 µm mesh screen.

The D50 of said sodium carbonate is suitably less than 140 µm, preferably less than 125 µm, more preferably less than 110 µm. The D50 may be at least 50 µm.

The Following Features are Generally Applicable to the Present Invention:

Said polymeric material may form part of a composition which may comprise said polymeric material and a filler means. Said filler means may include a fibrous filler or a non-fibrous filler. Said filler means may include both a fibrous filler and a non-fibrous filler. A said fibrous filler may be continuous or discontinuous.

A said fibrous filler may be selected from inorganic fibrous materials, non-melting and high-melting organic fibrous materials, such as aramid fibres, and carbon fibre.

A said fibrous filler may be selected from glass fibre, carbon fibre, asbestos fibre, silica fibre, alumina fibre, zirconia fibre, boron nitride fibre, silicon nitride fibre, boron fibre, fluorocarbon resin fibre and potassium titanate fibre. Preferred fibrous fillers are glass fibre and carbon fibre.

A fibrous filler may comprise nanofibres.

A said non-fibrous filler may be selected from mica, silica, talc, alumina, kaolin, calcium sulfate, calcium carbonate, titanium oxide, ferrite, clay, glass powder, zinc oxide, nickel carbonate, iron oxide, quartz powder, magnesium carbonate, fluorocarbon resin, graphite, carbon powder, nanotubes and barium sulfate. The non-fibrous fillers may be introduced in the form of powder or flaky particles.

Said composition may define a composite material which could be prepared as described in Impregnation Techniques for Thermoplastic Matrix Composites. A Miller and A G Gibson, Polymer & Polymer Composites 4(7), 459-481 (1996), EP102158 and EP102159, the contents of which are incorporated herein by reference. Preferably, in the method, said polymeric material and said filler means are mixed at an elevated temperature, suitably at a temperature at or above the melting temperature of said polymeric material. Thus, suitably, said polymeric material and filler means are mixed whilst the polymeric material is molten. Said elevated temperature is suitably below the decomposition temperature of the polymeric material. Said elevated temperature is preferably at or above the main peak of the melting endotherm ($T_m$) for said polymeric material. Said elevated temperature is preferably at least 300° C. Advantageously, the molten polymeric material can readily wet the filler and/or penetrate consolidated fillers, such as fibrous mats or woven fabrics, so the composite material prepared comprises the polymeric material and filler means which is substantially uniformly dispersed throughout the polymeric material.

The composite material may be prepared in a substantially continuous process. In this case polymeric material and filler means may be constantly fed to a location wherein they are mixed and heated. An example of such a continuous process is extrusion. Another example (which may be particularly relevant wherein the filler means comprises a fibrous filler) involves causing a continuous filamentous mass to move through a melt or aqueous dispersion comprising said polymeric material. The continuous filamentous mass may comprise a continuous length of fibrous filler or, more preferably, a plurality of continuous filaments which have been consolidated at least to some extent. The continuous fibrous mass may comprise a tow, roving, braid, woven fabric or unwoven fabric. The filaments which make up the fibrous mass may be arranged substantially uniformly or randomly within the mass. A composite material could be prepared as described in PCT/GB2003/001872, U.S. Pat. No. 6,372,294 or EP1215022.

Alternatively, the composite material may be prepared in a discontinuous process. In this case, a predetermined amount of said polymeric material and a predetermined amount of said filler means may be selected and contacted and a composite material prepared by causing the polymeric material to melt and causing the polymeric material and filler means to mix to form a substantially uniform composite material.

The composite material may be formed into a particulate form for example into pellets or granules. Pellets or granules may have a maximum dimension of less than 10 mm, preferably less than 7.5 mm, more preferably less than 5.0 mm.

Preferably, said filler means comprises one or more fillers selected from glass fibre, carbon fibre, carbon black and a fluorocarbon resin. More preferably, said filler means comprises glass fibre or carbon fibre.

In the following discussion of the invention, unless stated to the contrary, the disclosure of alternative values for the upper or lower limit of the permitted range of a parameter, coupled with an indication that one of said values is more highly preferred than the other, is to be construed as an implied statement that each intermediate value of said parameter, lying between the more preferred and the less preferred of said alternatives, is itself preferred to said less preferred value and also to each value lying between said less preferred value and said intermediate value.

Throughout this specification, the term "comprising" or "comprises" means including the component(s) specified but not to the exclusion of the presence of other components. The term "consisting essentially of" or "consists essentially of" means including the components specified but excluding other components except for materials present as impurities, unavoidable materials present as a result of processes used to provide the components, and components added for a purpose other than achieving the technical effect of the invention. Typically, when referring to compositions, a composition consisting essentially of a set of components will comprise less than 5% by weight, typically less than 3% by weight, more typically less than 1% by weight of non-specified components.

The term "consisting of" or "consists of" means including the components specified but excluding other components.

References herein such as "in the range x to y" are meant to include the interpretation "from x to y" and so include the values x and y.

Whenever appropriate, depending upon the context, the use of the term "comprises" or "comprising" may also be taken to include the meaning "consists essentially of" or "consisting essentially of", and also may also be taken to include the meaning "consists of" or "consisting of".

BRIEF DESCRIPTION OF THE DRAWINGS

Embodiments of the invention are further described by reference to the accompanying figures, in which.

DETAILED DESCRIPTION

The polymer described herein is a copolymer based on polyketone chemistry which falls into the general class of polymers called polyaryletherketones (PAEKs). In the world of chemistry, this terminology covers a wide range of polymers comprising aromatic moieties connected by ketone and ether linkages at various ether to ketone ratios and with defined sequencing. The PAEK copolymer described herein is PEEK/PEDEK copolymer, having a melting temperature of $T_m$ 305° C., and an SV 130 Pa·s (measured by a Standard method as defined in ISO11443:2014, at 400° C., at a shear rate of 1000 s$^{-1}$). This particular PAEK copolymer, has a lower crystalline melting temperature than PEEK, or (polyetherketoneketone) PEKK, whilst substantially retaining mechanical, physical and chemical resistance properties typical of PEEK. The mechanical properties the PEEK:PEDEK polymer are shown in Table 1.

TABLE 1

Mechanical properties of PEEK:PEDEK copolymer.

| Property description | Test | | Units | Value |
|---|---|---|---|---|
| Tensile strength | Yield, 23° C. | ISO 527 | MPa | 90 |
| Tensile elongation | Break, 23° C. | ISO 527 | % | 15 |
| Tensile modulus | 23° C. | ISO 527 | GPa | 3.5 |
| Flexural strength | 23° C. | ISO 178 | MPa | 150 |
| Flexural modulus | 23° C. | ISO 178 | GPa | 3.3 |
| Izod impact strength | Notched, 23° C. | ISO 180/A | kJm$^{-2}$ | 5.0 |

Further details of the PEEK:PEDEK copolymer used herein are described in WO2014207458 A1 which is hereby incorporated by reference.

The copolymer is semi-crystalline (25-30% typically) at cooling rates consistent with oven or press consolidation (5-10° C./minute). The melting temperature is around 305° C. as measured using differential scanning calorimetry (DSC).

The Glass Transition Temperature ($T_g$), the Cold Crystallisation Temperature ($T_n$), the Melting Temperature ($T_m$) and the recrystallization temperature for the polymer were determined using the four-step DSC method described hereinbefore on page 7.

Figure 1:
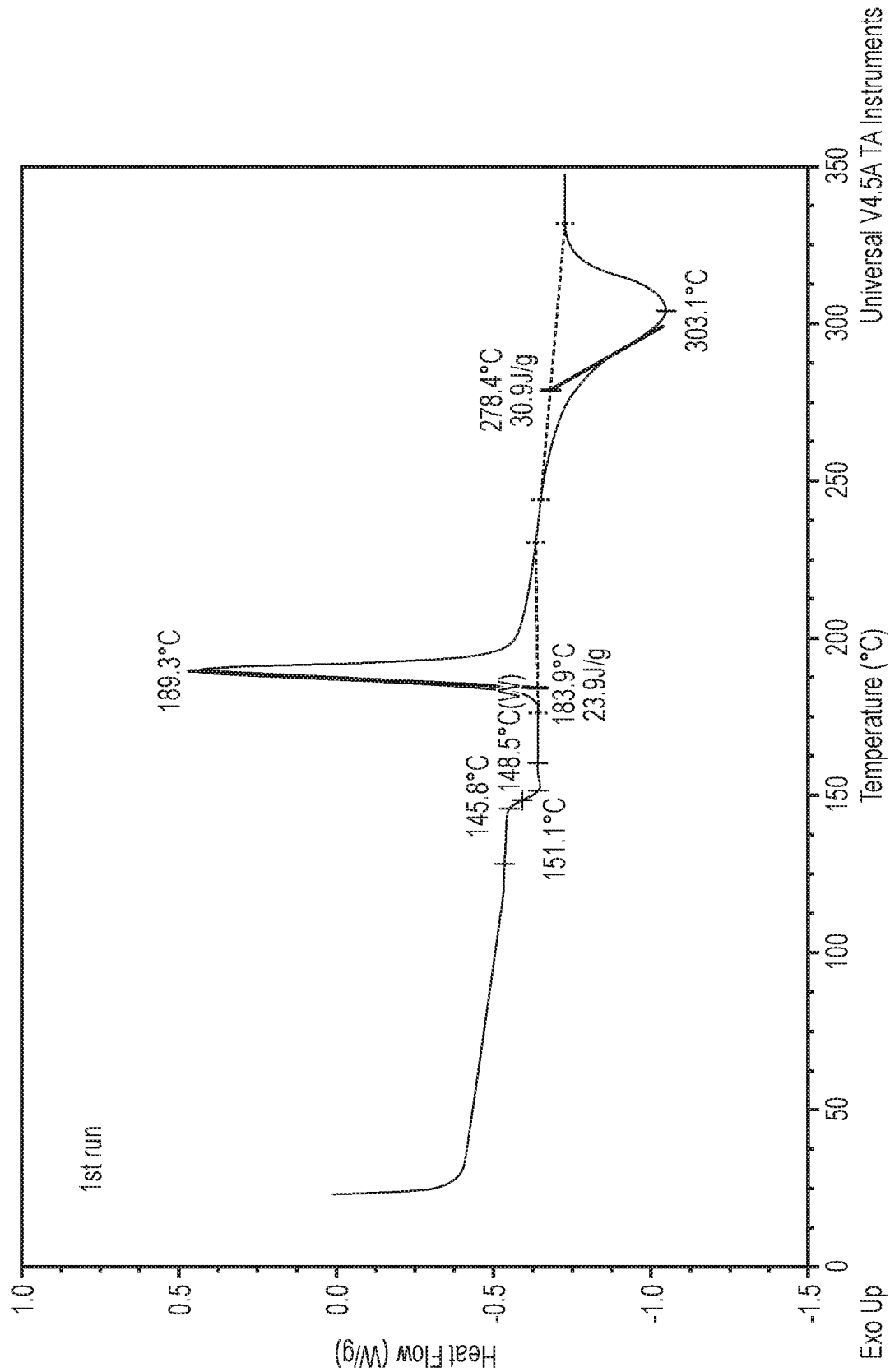
FIG. 1 shows a first run of Differential Scanning calorimetry (DSC) of the raw polymer.
Figure 2:
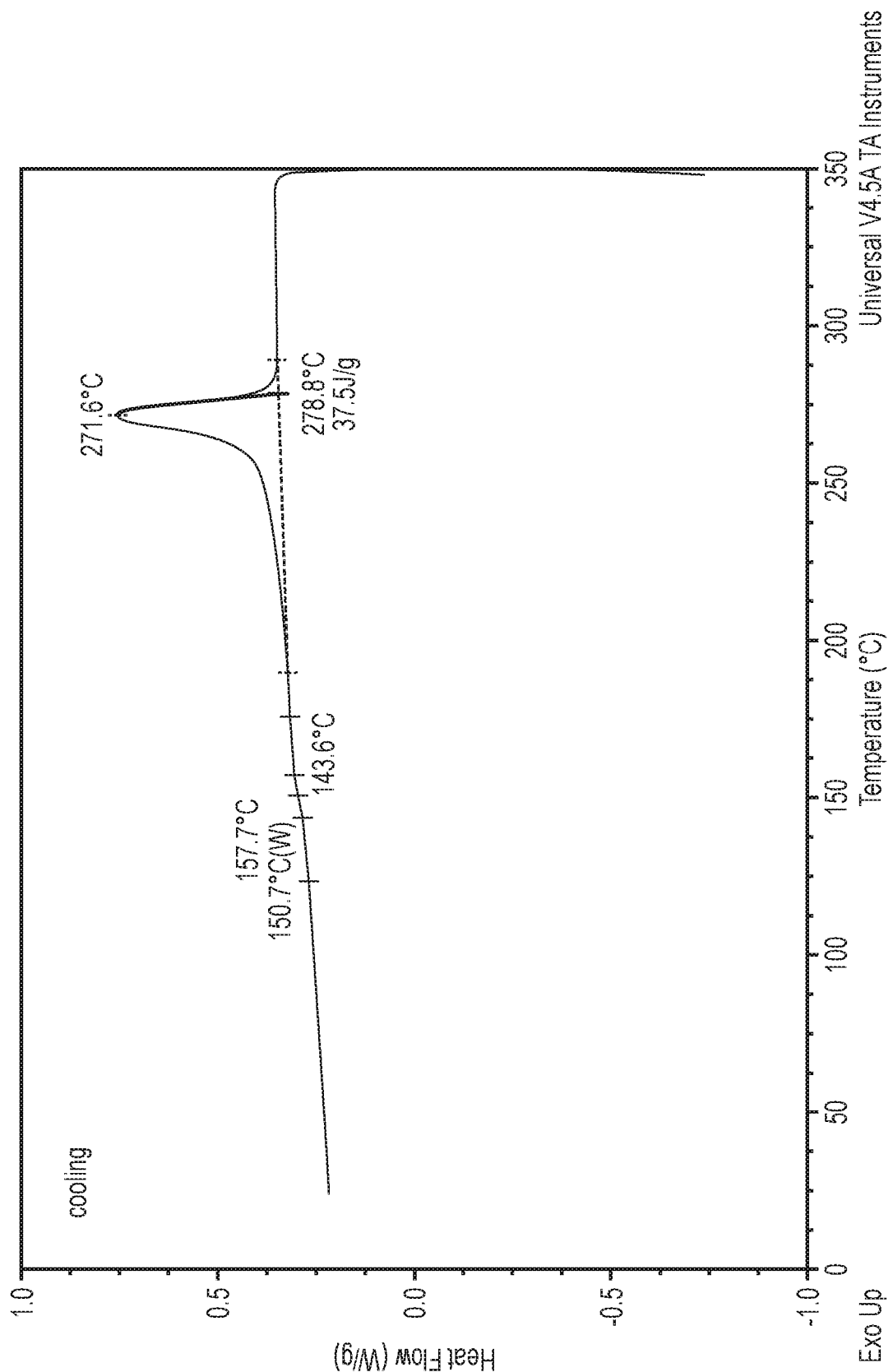
FIG. 2 shows the resulting DSC cooling curve of the raw polymer.
Figure 3:
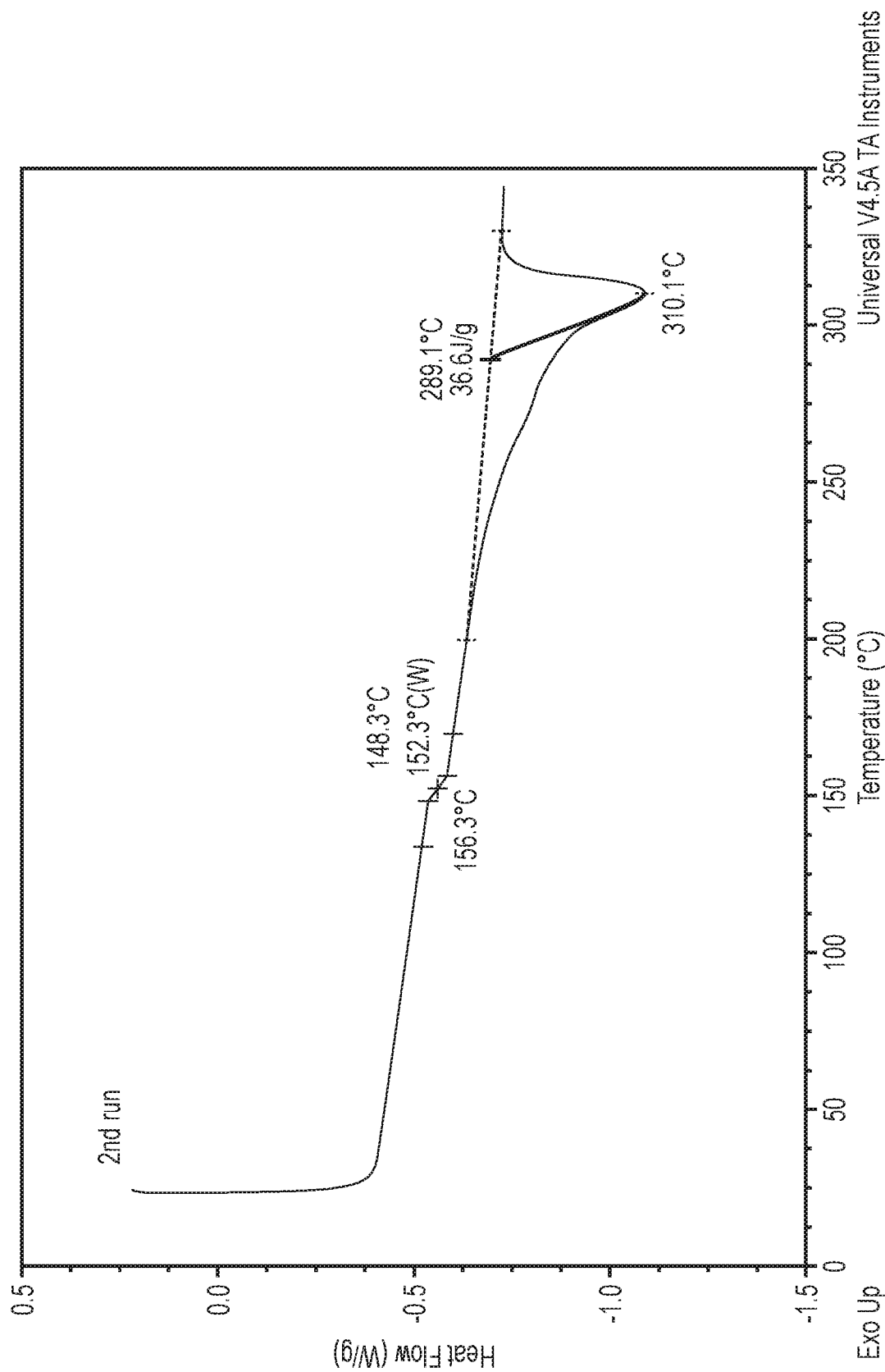
FIG. 3 shows a second run of DSC of the raw polymer.

DSC thermographs for amorphous pressed films made from raw polymer (no carbon fibres) are shown in FIGS. 1 to 3 after the first temperature cycle (a), the cooling phase (b) and the second cycle (c) respectively. These confirm key thermal transitions over the temperature range with a cold crystallisation peak at 189° C., crystalline melting point in this example of 303° C. and recrystallization peak at 271° C. The degree of crystallisation upon cooling reached 28% and the glass transition temperature on the second cycle was 148° C.

Composite prepreg tapes were prepared comprising unidirectional carbon fibres (Hexcel AS4 and AS7, supplied by Hexcel Composites) impregnated with PEEK:PEDEK copolymer. Tapes for AFP were prepared by slitting to 6.35 mm±0.125 mm. Tapes for hand layup were prepared at a width of 50 mm±0.125 mm. The details are for these tapes are shown in Table 2.

Composite prepreg tapes are formed by submerging the fibres in a dispersion of particles of polymeric materials as described in 'Thermoplastic Aromatic Polymer Composites: A Study of the Structure, Processing and Properties of Carbon Fibre Reinforced Polyetheretherketone and Related Materials' by Cogswell, 1992.

TABLE 2

Prepreg tapes for AFP and hand layup

| Prepreg | Fibre | Fibre Area Weight (FAW g/m$^2$) | Prepreg tape width (mm) | Process (layup and consolidation) |
|---|---|---|---|---|
| PEEK:PEDEK/CF | AS4 | 134 | 6.35 ± 0.125 | AFP/Press |
| PEEK:PEDEK/CF | AS7 | 192 | 50.0 ± 0.125 | Hand layup/Press |
| PEEK:PEDEK/CF | AS7 | 192 | 50.0 ± 0.125 | Hand layup/Oven |

The composite laminates were formed using different processing techniques.

Automated Fibre Placement (AFP)

Tapes with a fibre area weight (FAW) of 134 gsm (Hexcel™ AS4 carbon fibre) nominally 6.35 mm wide (within the width tolerance) were laid by a Coriolis™ AFP machine (CORIOLIS COMPOSITES TECHNOLOGIES S.A.S, France) to create partially consolidated laminates with fibre orientations and laminate thicknesses suitable for mechanical testing. These were fully consolidated by pressing between steel caul plates and polyimide film treated with Frekote™ 55 mould release in a computer controlled Lauffer hydraulic press (Maschinenfabrik Lauffer GmbH & Co. KG, Germany) fitted with electrical platen heating and air/water cooling. The press was programmed with the requisite temperature and pressure sequence, as described below.

Hand Layup

Panels made from hand laid tapes were prepared as follows. Strips of prepreg tape (50 mm wide with AS7 Hexcel carbon fibres at a FAW of 192 g/m$^2$) were cut and stacked by hand using a hot iron operating above $T_m$, to tack weld and/or seam weld the tapes together. Welding was done at multiple points along and across the tape to form kitted ply lay-ups with ply stacking sequences and orientations that met the requirements for mechanical testing as detailed in Table 3.

In-Situ Layup

Panels made using in-situ layer were also prepared. In-situ layup comprises arranging the PEEK:PEDEK composite tape in a plurality of layers and heating the arranged composite tape immediately after laying to consolidate the composite tape to the preceding layer or surface. Typically, in-situ layup comprises the use of a laser to heat the composite tape. Other heat sources are available. The localised heating from the laser causes the polymeric material in the composite tape to melt and thereby consolidate with the previous layer.

TABLE 3

Layup sequence for hand-laid 50 mm wide prepreg tapes

| Property | Lay-up | Number of Plies |
|---|---|---|
| In plane shear strength and modulus | [+45/−45]$_{4S}$ | 16 |
| Compression after impact (CAI) | [+45/0/−45/90]$_{3S}$ | 24 |
| Mode I (G1c) Fracture Toughness | [0]$_{18}$ | 18 |
| Plain tensile strength and modulus | [+45/0/−45/90]$_{3S}$ | 24 |
| Filled hole tensile strength (FHT) | [+45/0/−45/90]$_{3S}$ | 24 |
| Plain compression strength and modulus | [+45/0/−45/90]$_{3S}$ | 24 |
| Open Hole Compression (OHC) | [+45/0/−45/90]$_{3S}$ | 24 |
| Filled Hole Compression (FHC) | [+45/0/−45/90]$_{3S}$ | 24 |
| Bearing strength | [+45/0/−45/90]$_{3S}$ | 24 |

These kitted stacks were then processed either by compression moulding in the Lauffer platen press, or by oven processing using only vacuum and temperature to achieve consolidation. In practice an autoclave was used for this purpose [Thermoplastic Composite Research Centre (TPRC) in Enchede, Holland] although without any applied pressure the autoclave was used only as an oven to heat the prepreg. This process is referred to here as Out-of-Autoclave (OoA) processing, in common with industry standard nomenclature. Kitted prepreg stacks were positioned on a steel plate and covered with a breather layer (glass cloth) separated with Frekote 55 treated polyimide film. The whole stack and associated layers of breather and film layers were sealed within a covering layer of polyimide film, which was bonded to the base plate using a high temperature resistant sealing adhesive around the perimeter.

Process Thermal Cycles

The process cycles used in the preparation of test laminates are shown in Tables 4, 5 and 6. Table 4 illustrates the press cycle used to consolidate the prepreg material laid by AFP which is also illustrated for clarity in FIG. 4.

TABLE 4

Press consolidation cycle for AFP laid panels

| Press | Hydraulic |
|---|---|
| Platen Heating | Electrical |
| Cooling | Water/Air mix |
| Heat up rate | 7° C./minute |
| Hold temperature | 350° C. |
| Hold time at temp. | 15 minutes |
| Hold pressure | Two step: ramp 2 Bar then 6 Bar at max. temp. |
| Cool down rate | −4.5° C./minute |

Press Cycle for Hand Laid Panels

TABLE 5

Press consolidation cycle for hand laid panels

| Press | Hydraulic |
|---|---|
| Platen Heating | Electrical |
| Cooling | Water/Air mix |
| Heat up rate | 7° C./minute |
| Hold temperature | 360° C. |
| Hold time at temp. | 30 minutes |
| Hold pressure | 1 bar |
| Cool down rate | −5° C./minute |

Oven Cycle for Hand Laid Panels

TABLE 6

Oven consolidation cycle (using autoclave without added pressure)

| | |
|---|---|
| Heating | Electrical |
| Cooling | Air |
| Heat up rate | 7° C./minute |
| Hold temperature | 360° C. |
| Hold time at temp. | 30 minutes |
| Hold pressure | 1 bar |
| Cool down rate | −6° C./minute |

Post Process Analyses

Physical and mechanical testing of all laminates was undertaken by GMA-WERKSTOFFPRÜFUNG GmbH (Stade, Germany). Laminates were ultrasonically C-scanned with an Omniscan MX unit using water coupling and then sectioned and imaged by optical microscopy to assess consolidation quality. Samples were analysed for fibre content, matrix content and porosity content by acid digestion. Density was measured and the thermal characteristics were recorded by DSC to ensure that the laminates met expectations.

Mechanical Testing—Hand Laid Laminates

Specimens were removed from both oven and press consolidated laminates using a diamond saw and in accordance with the relevant test methods. These were tested in triplicate under room temperature/dry and in some cases elevated temperature wet conditions, as summarised in Table 7.

TABLE 7

Mechanical test matrix

| Properties | Specimen Geometry | Dry (R.T.) | Wet (70° C.) |
|---|---|---|---|
| In plane shear strength and modulus | 230 mm × 25 mm | 3 | |
| Compression after impact (CAI) 35J | 150 mm × 100 mm | 3 | |
| Mode I ($G_{1c}$) Fracture Toughness | 250 mm × 25 mm | 3 | |
| Plain tensile strength and modulus | 340 mm × 32 mm | 3 | |
| Filled hole tensile strength (FHT) | 280 mm × 32 mm | 3 | 3 |
| Plain compression strength and modulus | 162 mm × 32 mm | 3 | 3 |
| Open Hole Compression (OHC) | 162 mm × 32 mm | 3 | |
| Filled Hole Compression (FHC) | 162 mm × 32 mm | 3 | 3 |
| Bearing strength | 150 mm × 45 mm | 3 | |

Results

Consolidation

AFP panel

Figure 5:
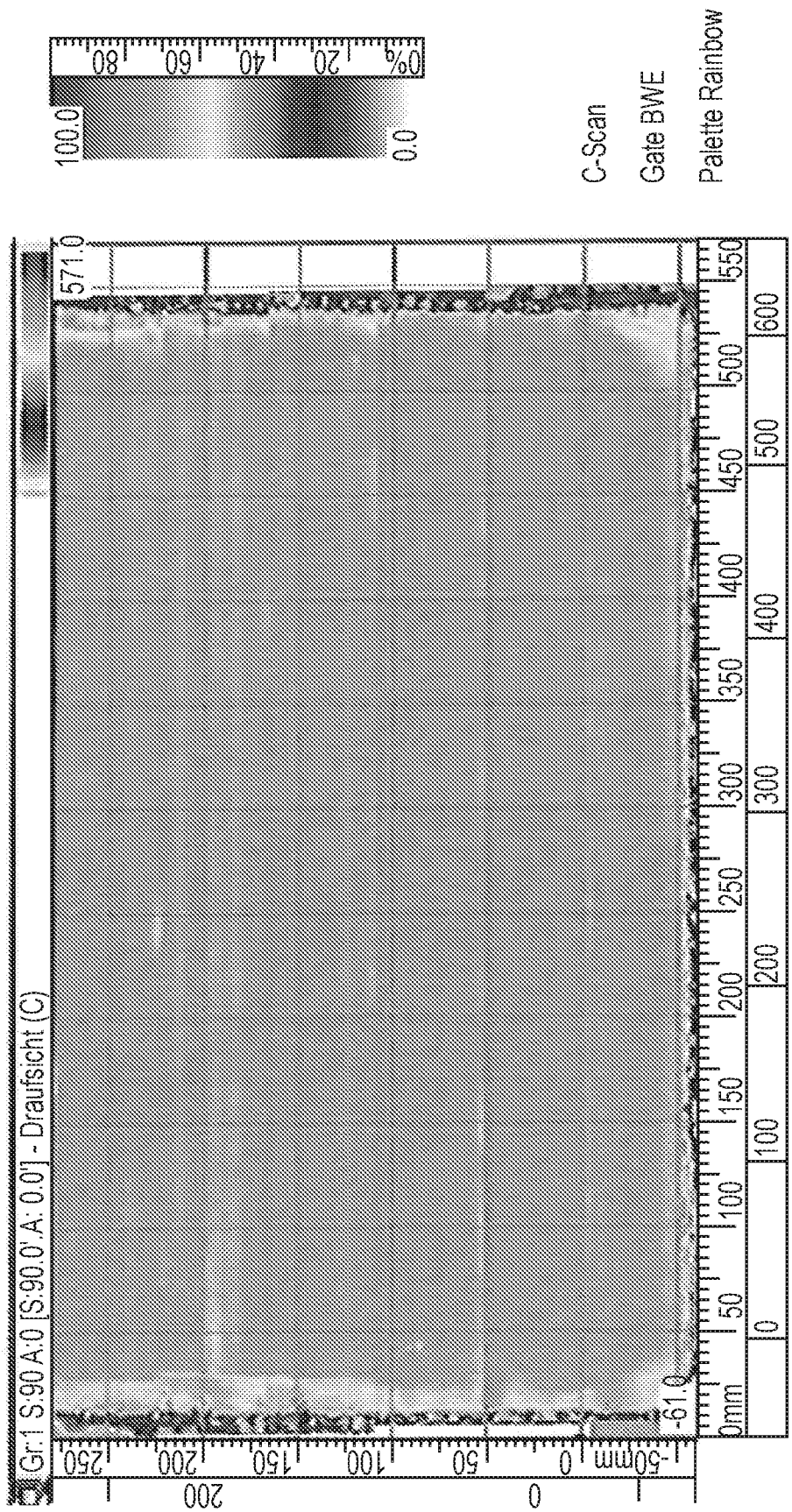
FIG. 5 shows a two-dimensional presentation of data from an AFP laid laminate consolidated in a press.

An example C-scan of an AFP laid/press consolidated laminate is illustrated in FIG. 5. This shows that the laminate was fully consolidated without any areas of delamination and is typical of all laminates made by this process during this work.

Density measurements according to ASTM D 3171 method 1B-15 did not detect any porosity in the consolidated laminates.

Figure 6:
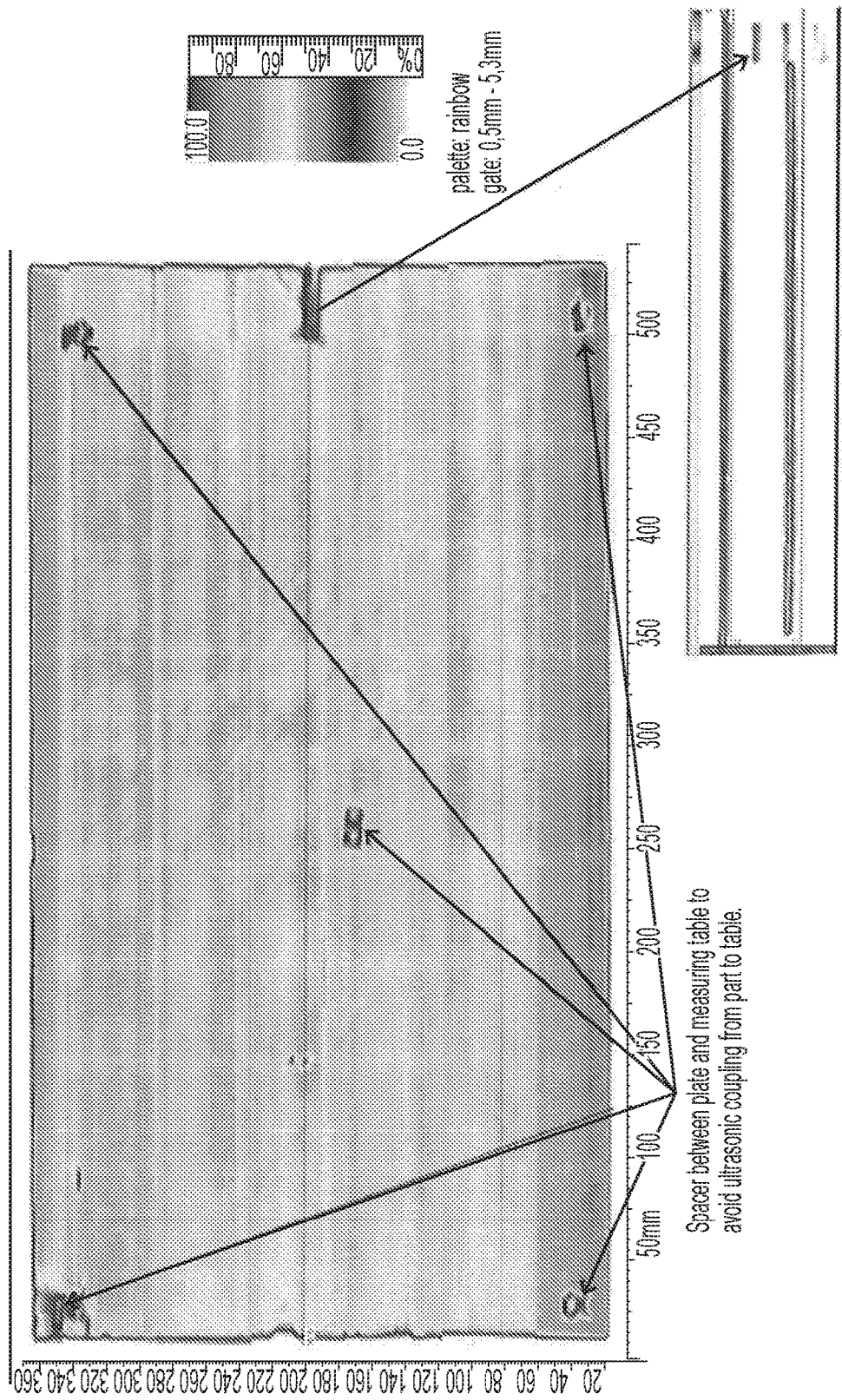
FIG. 6 shows a two-dimensional presentation of data from an oven consolidated laminate.
Figure 7:
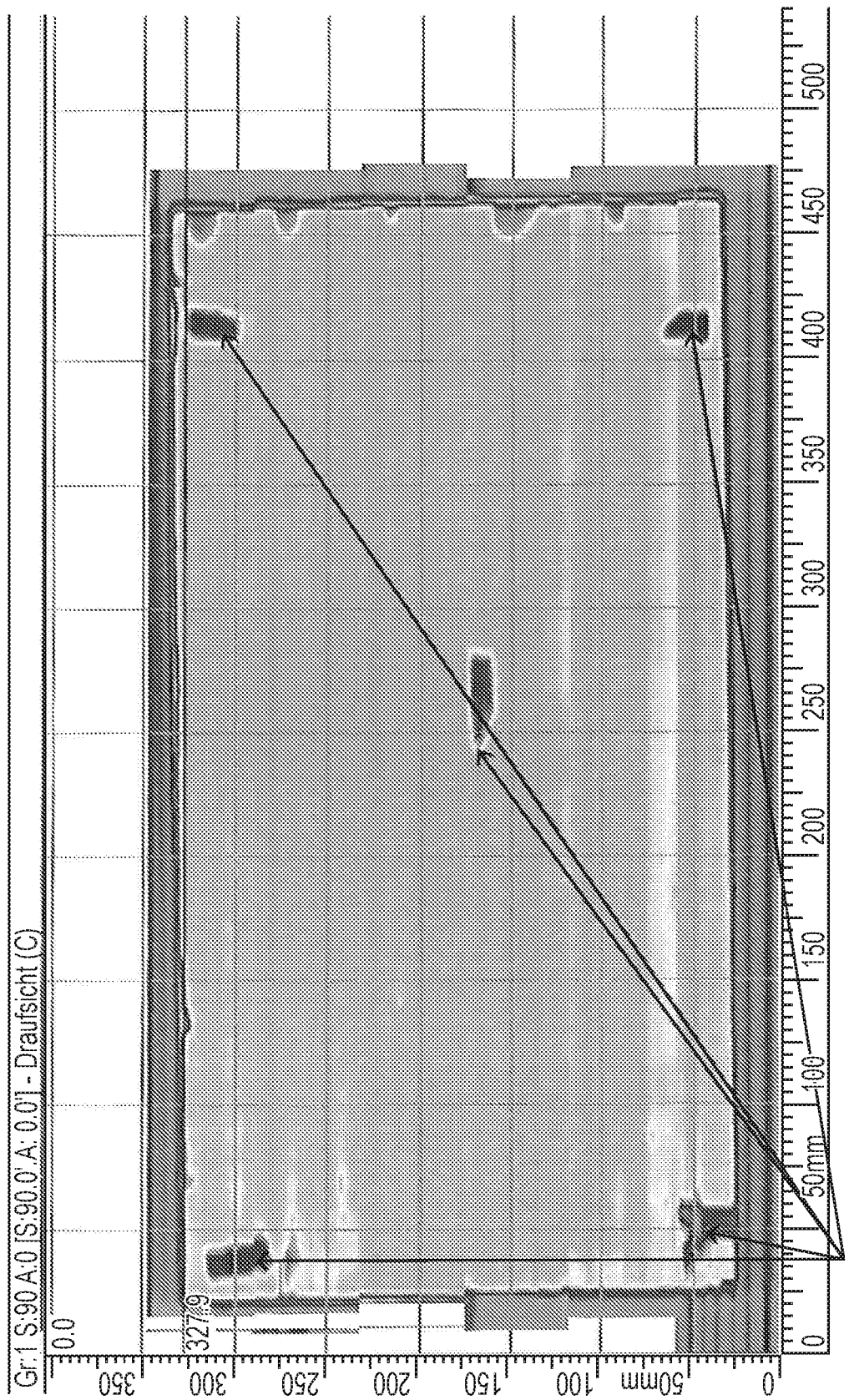
FIG. 7 shows a two-dimensional presentation of data from press consolidated laminate.

FIGS. 6 and 7 illustrate a typical C-scan result for laminates made by oven consolidation (FIG. 6) and press consolidation (FIG. 7). PEEK:PEDEK composite tape processed well and was fully consolidated in each case with no delamination evident.

Figure 8:
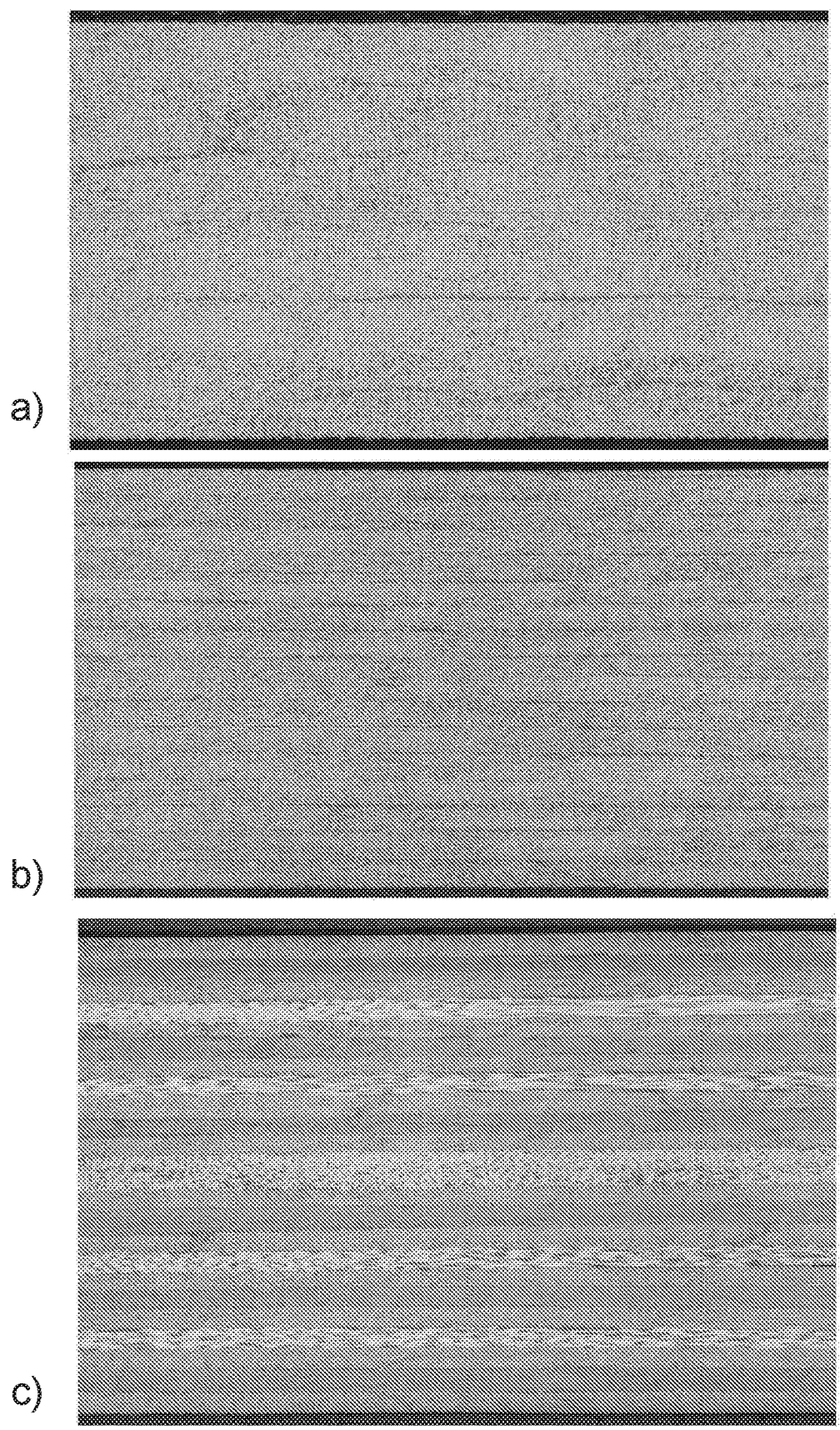
FIG. 8 (a to c) shows polished optical micro-sections of laminates consolidated out of autoclave where a) corresponds to a unidirectional laminate, b) corresponds to a ±45 laminate and c) corresponds to a quasi-isotropic laminate.

For the oven and press consolidated laminates made using hand layup, sections of laminate removed, polished and imaged by optical microscopy confirmed that full consolidation had occurred in all cases. Example micro-cuts for the oven processed laminates are shown in FIG. 8 a to c.

Differential Scanning Calorimetry (DSC)

Figure 9:
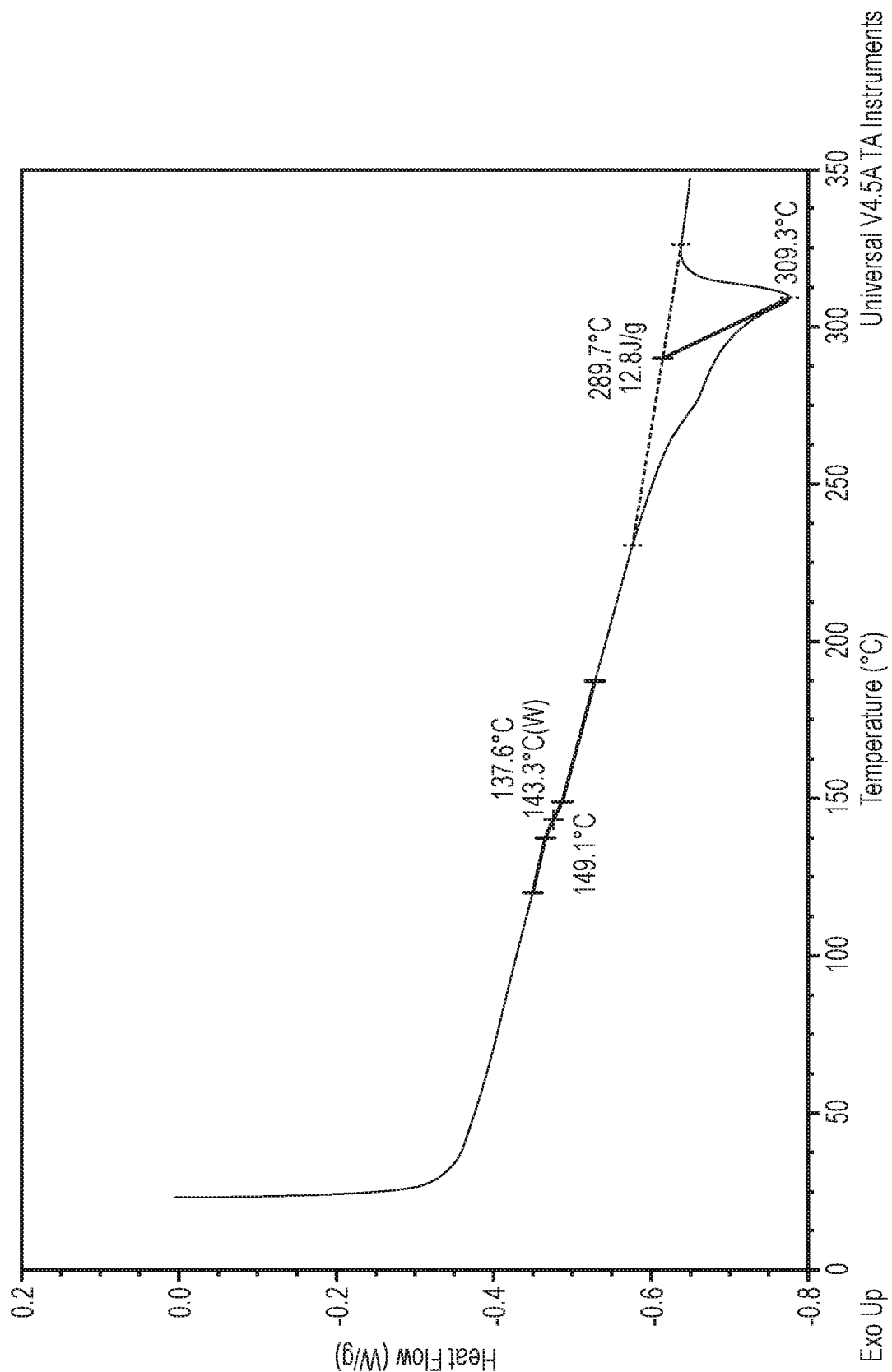
FIG. 9 shows an example DSC thermograph for oven processed laminate.
Figure 10:
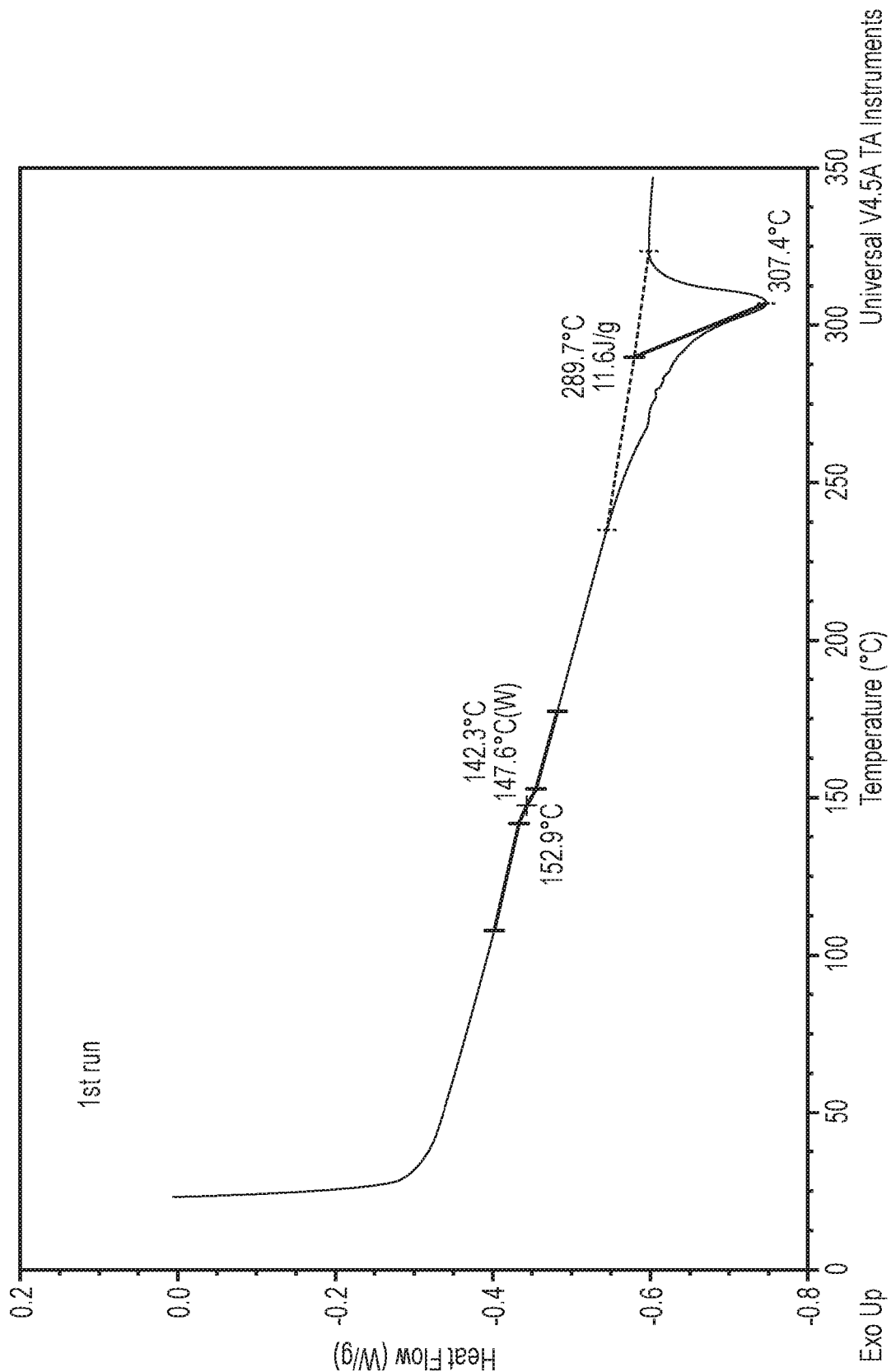
FIG. 10 shows an example DSC thermograph for platen pressed laminate.

Thermographic analysis of the consolidated laminates by DSC (Universal V4.5A TA Instruments) confirmed that in all cases (AFP laid/pressed and hand laid OoA and pressed laminates) the material was fully crystallised after processing. This was evidenced by the absence of a 'cold' crystallisation peak (at 189° C. in amorphous polymer) for any of the laminates produced. FIGS. 9 and 10 are example DSC thermographs for hand laid oven processed and pressed laminates respectively. By calculation, using a heat of crystallisation of 130 J/g, the area under the melt peak in each case gave crystallinity levels of between 25-28% for all laminates.

Mechanical Properties Test Results—Hand Laid Laminates Only

As this is a comparison between oven consolidated and press consolidated laminates only their relative performance is shown in Table 8. Here the press consolidated laminates represent the baseline level of performance with oven consolidated laminates being compared with the baseline values on a percentage basis.

TABLE 8

Comparative performance of oven-consolidated vs press-consolidated (baseline) laminates.

| | | Oven Consolidated Compared with Press Consolidated (% Retained Properties) | |
|---|---|---|---|
| Properties | | R.T. | 70° C. Wet |
| In plane shear strength and modulus | Strength | 95% | — |
| | Modulus | 104% | — |
| Compression after impact (CAI) | | 103% | — |
| Mode I ($G_{1c}$) Fracture Toughness | | 83% | |
| Plain tensile strength and modulus | Strength | 100% | — |
| | Modulus | 104% | — |
| Filled hole tensile strength (FHT) | | 103% | — |
| Plain compression strength and modulus | Strength | 98% | 101% |
| | Modulus | 105% | 103% |
| Open Hole Compression (OHC) | | 102% | — |
| Filled Hole Compression (FHC) | | 103% | 93% |
| Bearing strength | | 102% | — |

Figure 4:
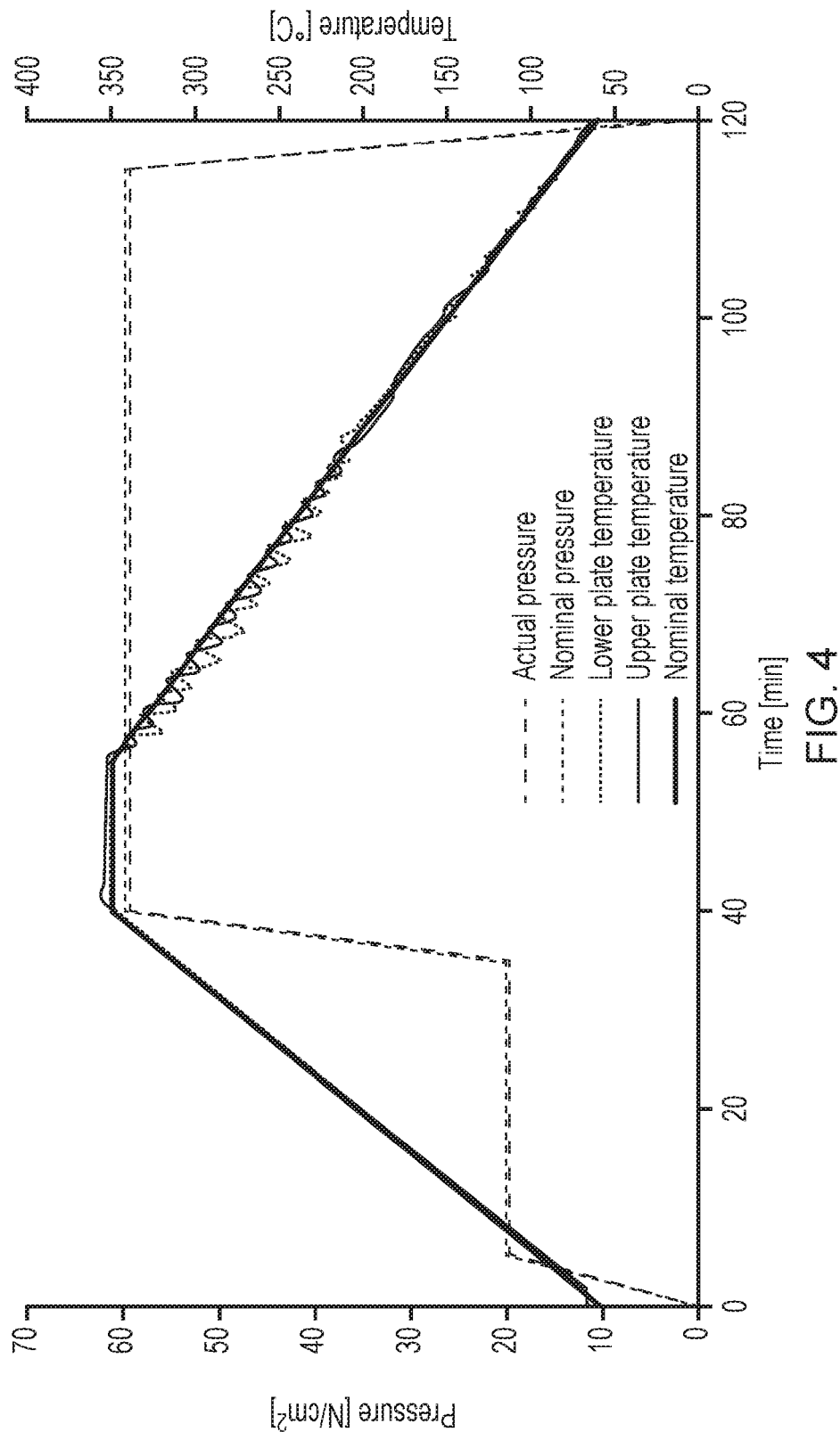
FIG. 4 shows a press cycle for tapes laid by automated fibre placement (AFP)

The C-scan image presented in FIG. 4 confirms that PEEK:PEDEK composite tapes can be laid by AFP and pressed to create fully consolidated laminates. Density measurements (ASTM D 3171 method 1B-15) confirm that laminates are fully dense, with no measurable void content.

Also this work has shown that PEEK:PEDEK composite tape can be fully consolidated by low pressure out of autoclave (OoA) processing, or with a low pressure platen press, using as little as 1 bar, as illustrated in sectional micrographs exemplified in FIGS. 6a to c, creating fully dense composites with minimal voids (below detection). Laminate compaction quality has been confirmed by C-scanning, as shown in FIGS. 6 and 7.

With its lower melting temperature compared with PEEK (305° C. vs 343° C.) PEEK:PEDEK unidirectional tape offers a wider processing window. DSC results (FIGS. 9 and 10) show that cooling at moderate rates, as with press and oven cycles (i.e. −5° C./minute) allows full crystallinity to be achieved at levels of about 28% which imparts maximum mechanical properties, heat and chemical resistance.

The mechanical properties of composite laminates made by either process are very comparable as shown in Table 8, illustrating that the material can be processed by either route. The low pressure processing ability of PEEK:PEDEK composite prepreg tape is a major advantage for processors and opens the gates to the production of high quality parts utilising out of autoclave processing.

Preformed material can be pressed by hot stamping processes to produce parts rapidly, meeting the demands for higher throughput rates required to meet aircraft build targets discussed in the introduction.

The conclusion from this work is that PEEK:PEDEK copolymer processes equally well under oven consolidation, press consolidation and in-situ consolidation, using hand layup or automated fibre placement to create highly consolidated laminates with substantially identical physical and mechanical properties, opening a broader range of manufacturing options for aerospace parts. The lower melting temperature of PEEK:PEDEK copolymer widens the processing window whilst still allowing fully crystalline morphology to develop through the cooling phase.

It has also been found that in-situ consolidation of PEEK:PEDEK composite tape provides additional benefits including parts having very low porosity levels while also exhibiting improved speed of manufacture due to increasing layup speeds. Further benefits include the reduction in the cost of manufacture of composite parts as the energy consumption of consolidation is reduced while still providing composite parts having low levels of porosity.

The present invention may also be applied to the use of comingled fibres formed from PEEK:PEDEK copolymer fibre and carbon fibre, that s comingled to form a PEEK:PEDEK and carbon fibre composite that is then processed according to the present invention.

Furthermore, additional benefits of the invention include a reduction in the energy required to make composite parts according to the process creating up to a 30% energy saving during oven consolidation over composite parts made using other PAEK tapes. A reduction in the processing temperature during tape placement was also achievable, and when using an auto fibre placement method, improvements in lay up speed may be realised, resulting in a higher throughput of composite parts. Irrespective of the method used to lay the tapes, a reduction in consolidation time was obtained compare with tapes made from other PAEKs.

Surprisingly, composite parts made according to the process exhibit a reduction in the porosity of the composite part indicating that the composite parts consolidate well without any voids or delamination. This surprising result was obtained despite the reduction in energy required by the process and despite an increase in speed of the process.

The invention claimed is:

1. A process for forming a composite part, the process comprising:
selecting a composite material comprising a polymeric material having a repeat unit of formula (I):

  (I)

and a repeat unit of formula (II):

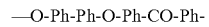  (II)

wherein Ph represents a phenylene moiety and wherein the polymeric material has a shear viscosity, SV, measured by a Standard method as defined in ISO11443:2014, is in a range from 100 Pa·s to 200 Pa·s, at 400° C., at a shear rate of 1000 s$^{-1}$;
and unidirectional fibres,
wherein the unidirectional fibres are submerged in a dispersion of particles of the polymeric material to form a pre-impregnated tape; then
arranging the pre-impregnated tape into a laminate comprising a plurality of layers of pre-impregnated tape to form a kitted stack; and
heating the kitted stack at a consolidation temperature of at least 305° C. for at least 15 minutes at a consolidation pressure of less than 10 bar.

2. The process according to claim 1, comprising heating the kitted stack at a consolidation temperature of at least 340° C.

3. The process according to claim 1, wherein the consolidation pressure is between atmospheric pressure and 8 bar.

4. The process according to claim 1, wherein the kitted stack is held under vacuum within a flexible membrane allowing atmospheric pressure to consolidate the stack.

5. The process according to claim 1, wherein the process further comprises arranging the pre-impregnated tape using hand lay-up.

6. The process according to claim 1, wherein the process further comprises arranging the pre-impregnated tape using automated fibre placement.

7. The process according to claim 6, wherein the process further comprises in-situ consolidation of the part.

8. The process according to claim 1, wherein the plurality of layers of pre-impregnated tape is arranged such that a direction of the pre-impregnated tape in a subsequent layer is positioned at 45 degrees to a direction of the pre-impregnated tape of a preceding layer.

9. The process according to claim 1, wherein in the arranging step, a subsequent layer of pre-impregnated tape is spot-welded to a preceding layer.

10. The process according to claim 1, wherein the heating step is carried out using a hot iron to tack the layers together.

11. The process according to claim 1, wherein the process further comprises arranging at least one functional layer within the kitted stack, wherein the at least one functional layer is selected from the following: an electrical isolating layer, an aesthetic layer such as a decorative layer, and a UV-protective layer.

12. The process according to claim 3, wherein the consolidation pressure is between atmospheric pressure and less than 5 bar.

13. The process according to claim 3, wherein the consolidation pressure is between atmospheric pressure and less than 3 bar.

14. The process according to claim 3, wherein the consolidation pressure is 1 bar.

* * * * *